No. 773,946. PATENTED NOV. 1, 1904.
J. E. LANGILL.
FILTER.
APPLICATION FILED JAN. 11, 1904.
NO MODEL.
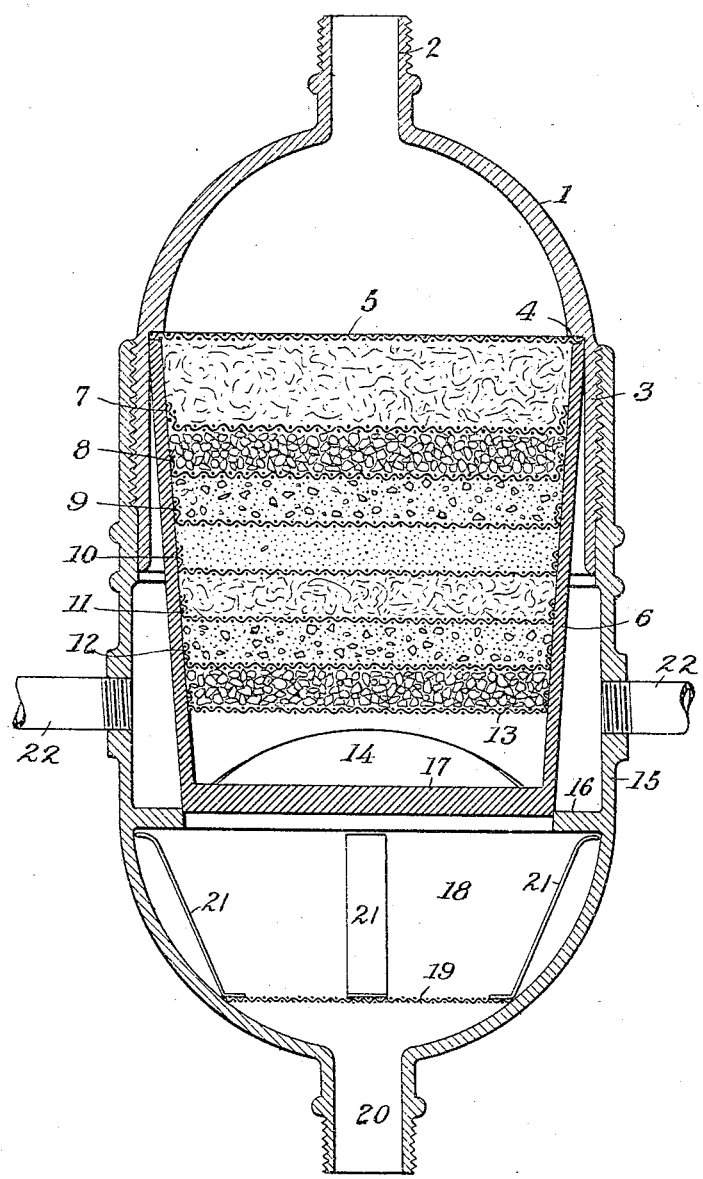
Witnesses:
Raphaël Ritter
C. S. Dunham
John E. Langill, Inventor
by Kerr, Page & Cooper Att'ys.

No. 773,946. Patented November 1, 1904.

UNITED STATES PATENT OFFICE.

JOHN E. LANGILL, OF NEW YORK, N. Y.

FILTER.

SPECIFICATION forming part of Letters Patent No. 773,946, dated November 1, 1904.

Application filed January 11, 1904. Serial No. 188,662. (No model.)

*To all whom it may concern:*

Be it known that I, JOHN E. LANGILL, a citizen of the United States, residing in New York, county of Kings, and State of New York, have invented certain new and useful Improvements in Filters, of which the following is a specification, reference being had to the drawing accompanying and forming part of the same.

My present invention relates to apparatus for filtering a liquid—as, for example, water for drinking purposes—to remove foreign matter therefrom, both organic and inorganic. Its object is to provide such an apparatus which shall be efficient in operation, compact and convenient in structure, of pleasing appearance, and inexpensive to manufacture.

It is desirable in filters to be able to renew the porous material through which the water passes, and I therefore provide novel devices by which this becomes simple and easy. I also provide a valve in the filter itself by which the flow of liquid therethrough may be regulated with exactness either to cut off the flow entirely at will or to determine the maximum rate of flow when the supply of water or other liquid thereto is open.

To these and other ends the invention consists in the novel features and combinations hereinafter described, and more particularly pointed out in the claims.

In the accompanying drawing the figure is a vertical section of the preferred form of filter, in which—

1 indicates a dome of hemispherical or other shape suitable for the purpose, having a tubular extension 2, screw-threaded, as shown, for attachment to a supply or discharge pipe. The dome has a depending cylindrical portion 3, screw-threaded, as indicated, leaving a shoulder 4. Resting against the shoulder is a strainer 5, composed of wire-gauze or other suitable material. The strainer is held in place by a frusto-conical receptacle 6, having its larger end open and its outer smaller end closed, as shown. The receptacle 6 and dome 1 are normally held together by any convenient means, as screw-threads, (not shown,) to prevent the two from falling apart when in use. Above the closed end of the receptacle is a quantity of porous materials, preferably arranged in layers supported by removable screens, as 7 8 9 10 11 12 13. The filtering material may be of any suitable character; but I prefer to employ a mass of fibers in the upper layer between the strainer 5 and the screen 7, then below that clean gravel, finer gravel and sand, fine sand, another layer of fibrous material, another layer of medium-sized gravel, and lastly a layer of coarser gravel. The materials need not be arranged in the order stated, however, and other substances than those specified may be used without departing from the spirit of my invention. Between the lower screen 13 and the closed end of the receptacle is a plurality of outlet-ports in the side wall, one of which is indicated by 14. A cylindrical outer casing 15, having screw-threads to engage the threads on the depending part 3 of the dome 1, as shown, is arranged to inclose the receptacle and has an inwardly-extending collar 16. The inner edge of the latter is tapered to coact with the smaller end of the receptacle when the casing is screwed upon the dome to constitute a valve. It will be seen that when the casing is unscrewed the valve-seat 16 will be carried down and away from the receptacle, thereby permitting the liquid to pass out through the outlet-ports and between the end 17 and the flange 16 into the lower chamber 18 of the casing 15, thence through a strainer 19 and out through the orifice 20. The latter strainer is preferably secured to legs 21, which abut against the lower side of the flange 16 and hold the strainer against the lower side of the chamber 18, as appears in the drawing.

The operation of the filter will be clear from the foregoing. The inlet-tube is secured to the liquid-supply pipe. The water or other liquid then passes through the strainer 5 and the various filtering layers out through the ports 14, and the casing 15 having been adjusted to withdraw the valve-seat 16 from engagement with the receptacle 6, the liquid passes then into the chamber 18 through the strainer 19 and out through the orifice 20. The flow may be entirely cut off by bringing the valve-plug and its seat together, or the two parts may be adjusted to permit a predetermined flow through the filter and the cutoff be effected by the usual valve located in the supply-pipe. This latter adjustment to permit only a predetermined flow I consider a very important feature of my invention, since the rate with which the liquid passes through may be regulated according to the amount of impurities in the liquid. For example, a liquid containing a large amount of foreign matter should pass through slowly enough to enable the filtering layers to catch substantially all of the impurities. On the other hand, a comparatively pure liquid does not require so much time for the removal of its foreign matter. These adjustments may be very accurately made merely by turning one of the parts—the dome 1 or the casing 15—relative to the other.

After the filter has been in use for some time it may be readily cleaned by flushing out the impurities collected therein. This is effected by inverting the device, opening the regulating-valve to its fullest extent, and permitting the water to flow freely through the apparatus. This will carry the foreign matter or the greater part thereof along with the swift current of the water. To renew the porous filtering material, the dome 1 and casing 15 are disconnected and the receptacle 6 withdrawn from the former. The strainer 5 may then be removed, followed by the filtering layers. New material is then placed in position and the parts are reassembled. If it is desired also to clean the strainer 19, the legs 21 may be bent inward far enough to clear the flange 16 and the whole removed.

The devices may be constructed of any convenient size. For example, the filter may be made small enough to be conveniently attached to an ordinary faucet or large enough to form a permanent fixture to which pipes are led from the water source. In either case it may be convenient to have other outlets from the filter than that furnished by the nozzle 20, in which case one or more pipes 22 may be connected to the casing at suitable points—as, for an example, in the positions shown. If the latter pipes are of metal and rigidly connected to the walls or other parts of the building, the adjustment of the regulating-valve will be effected by turning the dome 1 relative to the casing to permit the liquid to be withdrawn through the aperture 20 as well as through the pipes 22. If the valve is permanently adjusted in an open position, then of course it is immaterial whether the pipes 22 would prevent the rotation of the casing 15 or not.

The structure described above is a convenient embodiment of my invention; but obviously it is not the only form in which the same may be constructed, and I therefore do not consider myself limited thereto.

What I claim is—

1. The combination of a dome having an inlet-port, a tapered receptacle adapted to form a valve and having outlet-openings, a quantity of filtering material in the receptacle, and an adjustable casing connecting with the dome to inclose the receptacle and having a valve-seat to fit the smaller end of the tapered receptacle, as set forth.

2. The combination of a dome having an inlet-port, a tapered receptacle, having its smaller end closed and its larger end inserted in said dome, ports in the walls of the receptacle near its closed end, a quantity of filtering material in the receptacle supported therein above the ports, and an adjustable casing connecting with the dome to inclose the tapered receptacle, having a seat to fit the smaller end of the receptacle, as set forth.

3. The combination of a threaded dome having an inlet-port, a tapered receptacle having its smaller end closed and its larger end inserted in said dome, ports in the walls of the receptacle near its closed end, a quantity of filtering material in the receptacle supported therein above the ports, an adjustable casing connecting with the dome to inclose the tapered receptacle, having screw-threads to engage those on the dome and having a seat to fit the smaller end of the receptacle, as set forth.

4. The combination of a dome having an inlet-port, a removable receptacle having one end closed and its open end inserted in the dome, and having outlet-openings, a removable strainer over the open end of the receptacle, a plurality of removable screens in the receptacle carrying layers of filtering material, an adjustable outer casing having an outlet-port, connecting with the dome and coacting with the receptacle to constitute a valve, and a removable strainer over the outlet-port in the casing, as set forth.

5. The combination of a dome having an inlet-port, a tapered receptacle having one end closed and its open end inserted in the dome, a strainer removably held between the open end of the receptacle and the dome, and having outlet-ports, a quantity of filtering material in the receptacle, an adjustable casing having an outlet-port, connecting with the dome and coacting with the receptacle to constitute a valve, and a strainer removably supported between the valve and the outlet-port in the casing, as set forth.

6. The combination of a dome having an inlet-port, a tapered receptacle having one end closed and its open end inserted in the dome, a strainer removably held between the open end of the receptacle and the dome, and having outlet-ports, a quantity of filtering material in the receptacle, an adjustable casing, having an outlet-port, connecting with the dome and coacting with the receptacle to constitute a valve, and a removable strainer supported on legs between the valve and the outlet-port in the casing, as set forth.

7. The combination of a dome having an inlet-port, a removable receptacle having one end closed and its open end inserted in the dome, and having outlet-openings, a quantity of filtering material in the receptacle, an adjustable casing connecting with the dome to inclose the receptacle and having a valve-seat to fit the smaller end of the tapered receptacle, and one or more pipes connecting with the casing, as set forth.

JOHN E. LANGILL.

Witnesses:
THOS. J. BYRNES,
S. S. DUNHAM.